(12) United States Patent
La Crosse et al.

(10) Patent No.: US 9,365,775 B1
(45) Date of Patent: Jun. 14, 2016

(54) WASTE RECYCLING SYSTEM

(71) Applicant: YAGS, LLC, Evanston, IL (US)

(72) Inventors: Gaylen La Crosse, Evanston, IL (US); Jeremy La Crosse, Evanston, IL (US); Michael Galich, Evanston, IL (US)

(73) Assignee: YAGS, LLC, Evanston, IL (US)

( * ) Notice: Subject to any disclaimer, the term of this patent is extended or adjusted under 35 U.S.C. 154(b) by 0 days.

(21) Appl. No.: 14/317,310

(22) Filed: Jun. 27, 2014

(51) Int. Cl.
| | |
|---|---|
| *B01J 19/00* | (2006.01) |
| *B01J 19/18* | (2006.01) |
| *C10B 1/02* | (2006.01) |
| *C10B 1/00* | (2006.01) |
| *C10B 1/04* | (2006.01) |
| *C10B 1/06* | (2006.01) |
| *C10B 1/08* | (2006.01) |
| *C10B 1/10* | (2006.01) |

(52) U.S. Cl.
CPC .................................... *C10B 1/02* (2013.01)

(58) Field of Classification Search
CPC .... C10B 1/00–1/10; B01J 19/00; B01J 19/18; B01J 19/1812; B01J 19/1818; B01J 19/1831; B01J 2219/18–2219/185
See application file for complete search history.

(56) References Cited

U.S. PATENT DOCUMENTS

| | | |
|---|---|---|
| 4,686,008 A | 8/1987 | Gibson |
| 5,693,188 A | 12/1997 | Donnohue et al. |
| 6,270,630 B1 * | 8/2001 | Xing ...................... C10B 47/30 202/118 |
| 6,423,878 B2 | 7/2002 | Reverso |
| 7,188,571 B2 | 3/2007 | Nusimovich |
| 7,626,061 B2 | 12/2009 | Datsevich et al. |
| 7,802,528 B2 | 9/2010 | Shuman et al. |
| 7,947,155 B1 | 5/2011 | Green et al. |
| 8,057,666 B2 | 11/2011 | Allan et al. |
| 2008/0128259 A1 | 6/2008 | Kostek et al. |
| 2011/0048918 A1 | 3/2011 | Strezov et al. |
| 2011/0083953 A1 | 4/2011 | Horn et al. |
| 2011/0180382 A1 | 7/2011 | Hayward et al. |
| 2011/0278149 A1 * | 11/2011 | Hornung ................... C10B 1/10 201/12 |

* cited by examiner

*Primary Examiner* — Natasha Young
(74) *Attorney, Agent, or Firm* — Greer, Burns & Crain, Ltd.

(57) ABSTRACT

A portable reactor system for pyrolysis of waste plastic materials is provided. The reactor system can be easily scaled up or down and can be operated directly at the location where waste plastic materials are generated. Methods converting the plastic materials into fuel and other useful materials are also provided.

16 Claims, 4 Drawing Sheets

WASTE RECYCLING SYSTEM

CROSS-REFERENCE TO RELATED APPLICATIONS

This application is related to patent application Ser. Nos. 14/317,332 and 14/317,322, filed concurrently herewith and entitled "Methods for converting waste to useful materials," the disclosures of which incorporated herein by reference.

FIELD OF THE INVENTION

This invention relates to an apparatus and methods for recycling of waste plastic materials into liquid and gaseous hydrocarbons. In some embodiments, the invention also relates to heating waste plastics in a multistage reactor to break them down into smaller hydrocarbons, some of which are condensable into fuel.

BACKGROUND OF THE INVENTION

Polymers and plastics are widely used in our society for packaging, coatings and to make lightweight products. In food packaging applications, for example, polymers can be selected to act as barriers to moisture, oxygen and light that can cause the food to degrade. Frequently, multiple layers of plastics are used to provide barriers for several elements simultaneously.

The volume of plastics discarded by consumers is enormous, as can be attested by ever growing landfills. Consequently, different methods have been developed for recycling plastic materials. For example, U.S. Pat. No. 6,423,878 discloses a reactor with a molten catalyst bed for the pyrolysis of a polymeric material. Catalytic pyrolysis requires an expensive metal catalyst and only about 12 to 15 kilograms of plastic material are recycled per one liter of catalyst in 24 hours. Additional expenses may be incurred if waste plastic materials are to be transported to a particular location for recycling.

It would be beneficial to have an apparatus and methods for processing waste plastics locally and without a catalyst, using compact equipment that can be operated in the same locality where the waste is generated and that could be scaled down to a size suitable to handle the waste from an individual manufacturing plant. The present invention relates to addressing the need for a compact, energy-efficient apparatus for converting plastic materials into fuel and a method that permits to recycle a great variety of plastic materials locally.

SUMMARY OF THE INVENTION

One embodiment provides a system for converting waste hyrdocarbon materials into fuel. The system comprises a reactor which communicates with a condenser section. The reactor has at least two reactor sections: a first reactor section and a second reactor section arranged vertically relative to one another, and the first reactor section communicates with the second reactor section through a connection conduit. Waste hydrocarbon materials are converted into gaseous hydrocarbons in the reactor. The reactor further comprises at least one conveyor for communicating the waste hydrocarbon materials through the first and second sections, at least one heater for heating the first and second sections to cause the feedstock to convert to gas phase fuel products which are then transferred to a condenser section, where the gas phase fuel products are condensed into fuel.

Further embodiments provide a reactor with two reactor sections and in which each of the two reactor sections includes a plurality of conduits for communicating gas phase fuel products into a condenser section. The system is equipped with at least one heater which comprises a plurality of individually controllable heaters which are controlled based on a temperature of the gas phase fuel products measured in one of the plurality of conduits.

In some embodiments, a reactor is designed such that the first reactor section is horizontal and arranged directly above the second reactor section, the second reactor section arranged at a slight incline so that a first end of the second section having an entrance port communicating with the connection conduit is lower than a distal second end having an exit port. The reactor is further equipped with a vacuum source for evacuating substantially all of the oxygen from the first and second reactor sections.

In further embodiments, the first reactor section can be equipped with a first auger that communicates the waste hydrocarbon feedstock from a first section entrance port to a first section exit port. The second reactor section can be equipped with a second auger that communicates the waste hydrocarbon feedstock from a second reactor section entrance port to a second reactor section exit port. The first and second augers may be controlled independently from each other.

In further embodiments, a reactor for converting waste hydrocarbon materials includes a plurality of sub-zones arranged in sequence from a first reactor section entrance to a second reactor section exit, a final sub-zone proximate to the second reactor section exit having an internal temperature that is higher than any other sub-zone interior temperature.

Other embodiments provide a waste hydrocarbon recycling system comprising a reactor including a first reactor section arranged vertically above a second reactor section, a connection conduit connecting the first and second reactor sections, the second reactor section arranged at a slight decline with a first end proximate to the connection conduit higher than a distal second end. In this reactor, at least first and second transfer conduits are connected to each of the first and second reactor sections for transferring hydrocarbon gas products from the reactor sections. The transfer conduits are equipped with at least one temperature measurement device in each of the transfer conduits. The reactor is further equipped with a plurality of heaters provided on the first and section reactor sections configured to maintain the reactor sections at elevated temperatures to cause conversion of the feedstock to the hydrocarbon gas products. In the system of this embodiment, a condenser section is downstream from the reactor. The condenser section is in communication with transfer conduits and is configured to condense liquid petroleum from gas hydrocarbon products. The waste hydrocarbon recycling system is further equipped with a generator which can be used to convert at least a portion of gas products to energy which can be used to power a reactor heater.

DETAILED DESCRIPTION OF THE INVENTION

Figure 1:
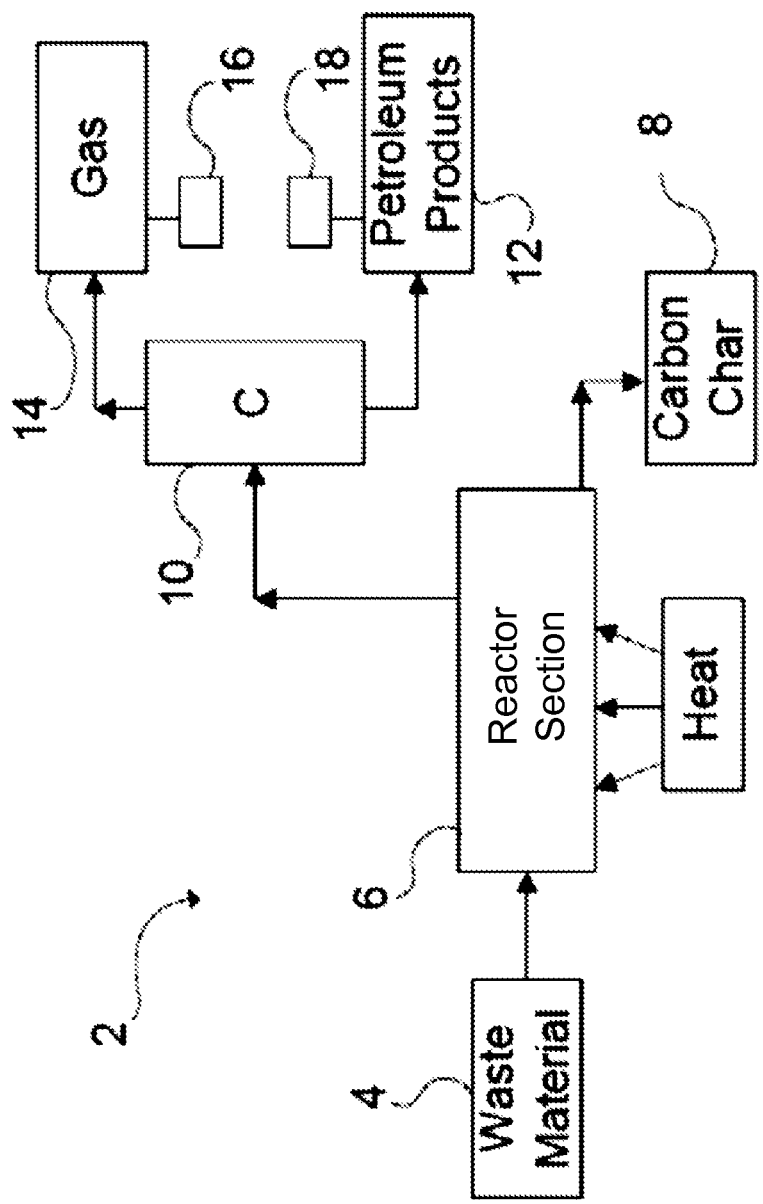
FIG. 1 is a schematic illustrating various features of a waste conversion system of the invention.

The present invention relates to an apparatus and process for converting waste hydrocarbon materials into fuel by pyrolysis. Referring now to FIG. 1, a conversion system shown generally at 2 is provided for converting waste hydrocarbon materials into useful fuels. As used herein, the term "waste hydrocarbon material" is to be broadly interpreted as referring to materials containing hydrocarbons that are unwanted products or byproducts. By way of illustration, waste hydrocarbon materials may include plastics (such as polyethylene (PE), polypropylene (PP), and others), wood, paper, landfill waste, and other materials that are unwanted products or byproducts of various processes or things.

Waste material, such as PE or PP, 4 is fed to a pyrolysis reactor section 6 for heating and conversion to gas/vapor phase. The reactor section 6 may be operated at a desired pressure, but is generally operated in the absence or low concentration of oxygen to avoid combustion. It may take any of a number of particular configurations, for example, with stainless steel construction in a generally tubular shape. It may be operated in a batch, continuous, or semi-continuous manner. Various ports and connections may be provided as desired, including an entrance port for receiving the waste material 4, and exit port for expelling the char 8, and one or more gas ports for collecting and communicating vapor and gas. Agitation or conveyor(s) may be provided to assist in the movement and distribution of waste material 4 within the reactor section 6.

Heat is applied to the reactor system 6 in a desired amount to cause the waste hydrocarbon to be converted to shorter chain hydrocarbons that are in the gas or vapor phase due to the operating temperature and pressure. Heat may be generated by combustion of fuel or through conversion of electrical power or through other known steps. Temperatures and pressures are maintained in a desired range to avoid unwanted reaction of the gas/vapor phase materials. Particular temperatures and pressures will vary with application parameters, with factors including waste material 4 composition, waste material 4 residence time in the reactor section 6, and the like. In some embodiments that utilize less than atmospheric pressure, temperatures in the range of 500°-800° may be maintained. In addition to gas and vapor products, solid carbon char 8 may also be produced from the reactor section 6.

The gas and vapor products of the reactor section 6 are passed to a condenser section 10 to separate different useful components. Decreased temperatures are featured in the condenser section 10 to cause vapor phase petroleum products to condense from the vapor phase to a liquid phase. The decreased temperatures may be achieved through use of one or more heat exchangers which may use, for example, chilled or ambient water or refrigerant passed through a tube and shell configuration. The condenser section 10 may include a single or multi-stage condenser, and/or a distillation separator, and/or other components. The liquid petroleum products 12 are then collected. These products may include what resembles a raw crude oil, or may be further separated to collect various weight petroleum products such as lubricating oils, diesel fuel, heating oil, gasoline, jet aviation fuel, and others. In some embodiments, separation into some or all of these components is performed. In some other embodiments, the liquid petroleum product is not separated, but instead is passed on to another party for desired processing. In some embodiments, the pyrolysis converter system 2 further includes distillation elements configured to perform this separation. Combustible gasses 14 also result from the condenser 10, and may include propane, ethane, methane, and the like. For convenience, the combustible gasses 14 and liquid petroleum products 10 may collectively or individually be referred to herein as "useful fuel".

Measurement devices 16 and 18 are provided to measure the amount of gas and petroleum produced. The measurement devices 16 and 18 may be any of a variety of suitable devices, including a volume transducer to determine the amount of gas therein and a level meter to determine the liquid fill level of a vessel of a known volume to determine the amount of liquid petroleum product therein.

It will be appreciated that further details and elements of an example pyrolysis system are not necessary for present discussion and have been omitted for sake of brevity. These may include, for example, various valves, pumps, controllers, heaters, tanks, measurement devices, meters, controllers, and the like. As an example, the system 2 may be operated under full or partial vacuum, and with a non-combustible pad gas. A vacuum source and a pad gas sources can be provided for these purposes. For further information on some example pyrolysis conversion systems as well as their operation, reference is made to U.S. Pat. Nos. 4,412,889, and 4,217,175 which patents are incorporated herein by reference.

Figure 2:
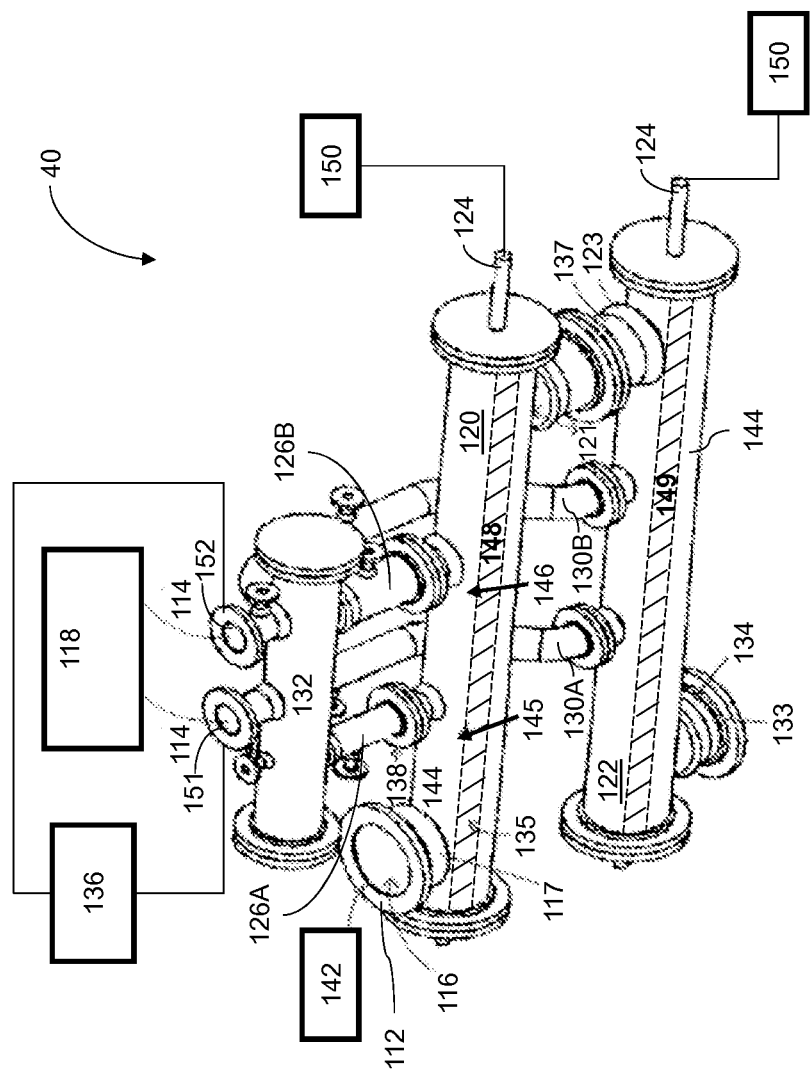
FIG. 2 is a perspective view of a representative reactor of the invention.

Referring to FIG. 2, a reactor, generally designated 40, may comprise at least two reactor sections, a first upper reactor section 120 and a second bottom reactor section 122, the two sections being vertically arranged relative to one another and communicating with one another via at least one conduit 137. The reactor sections 120 and 122 may be tubal in shape. They may be of the same length, or one of the reactor sections can be longer than the other. Both sections can be of the same diameter or the first section 120 may have a diameter larger than that for the second section 122. In some embodiments, the first section 120 may have a diameter smaller than that for the second section 122.

In some embodiments, at least one additional tubal reactor section (not shown in FIG. 2) can be further connected to either the first reactor section 120 or the second reactor section 122 and vertically arranged relative thereto. At least in some embodiments, the reactor system 40 may be a multi-unit apparatus comprising of several units, each of the units being built of the two reactor sections 120 and 122 which are vertically arranged and connected.

The first reactor section 120 may be equipped with at least one entrance port 117 through which waste hydrocarbon materials 116 enter the section 120. The first reactor section 120 may further be equipped with an exit port 121 connected to an entrance port 123 of the second reactor section 122 by the vertical conduit 137.

In some embodiments, the reactor section 120 and the reactor section 122 are each preheated to a predetermined temperature by a heater 144. Suitable heaters include, but are not limited to, electric heaters and heaters further comprising a temperature monitor. At least in some embodiments, the heater 144 may be wrapped around the reactor section 120 and the rector section 122 and it may comprise heating zones 135, 145 and 146 that can be operated at different temperatures.

At least in some embodiments, the reactor section 120 and the reactor section 122 are connected to a vacuum pump 136 through outlets 151, 152. The vacuum pump 136 generates and maintains the oxygen-free environment inside the reactor section 120 and the reactor section 122.

In some embodiments, the reactor 40 may further comprise means 148 and 149 for moving waste hydrocarbon materials inside of the reactor section 120 and the reactor section 122 and for communicating waste hydrocarbon materials through the reactor sections. The means 148 and 149 may each be independently a conveyer, auger and a screw auger. The means 148 and 149 may be further connected to a device 150 for pre-programming and controlling a speed at which waste hydrocarbon materials are moved through the reactor sections 120 and 122. The device 150 is connected with the means 148 and 149 through the outlets 124.

At least in some embodiments, the reactor system 40 may include a first auger 148 and a second auger 149, the first auger 148 being located in the first reactor section 120 and the second auger 149 being located in the second reactor section 122. The first auger 148 communicates waste hydrocarbon materials from the entrance port 117 of the first section 120, through the first reactor section 120 and to the exit port 121 in the first reactor section 120. The second auger 149 performs a similar function in the second reactor section 122. At least in some embodiments, the first auger 148 and the second auger 149 can be independently controllable. In some embodiments, at least one of the two augers is heated and can be maintained at a pre-programmed elevated temperature.

The reactor system 40 is further configured for connection to an upstream feeder section 142 and a downstream condenser section 118 designed to condense gaseous hydrocarbons into liquids, including fuel. An example feeder section 142 may include a heater for heating feedstock, a conveyor for conveying it and a compressor for compressing it. At least in some embodiments, the upstream feeder section 142 is fitted with an airlock 112 so that communication with the reactor section 120 is performed under a desired sub-atmospheric pressure. The reactor section 120 and the reactor section 122 may be fitted with at least one conduit 126A, 126B, 130A and 130B for communicating hydrocarbon vapors 114 from the heater sections 120 and 122 to the downstream condenser section 118. In FIG. 2, conduits 126A and 126B communicate hydrocarbon vapors from the reactor section 120 and conduits 130A and 130B communicate hydrocarbon vapors from the reactor section 122. The vapors are then communicated into at least one condenser section 118 where they can be condensed into useful fuel, such as, for example, liquid petroleum products such as diesel. Flammable gasses may also result from the Condenser section 118.

During pyrolysis of waste hydrocarbon materials in the reactor system 40, char is generated as a by-product. Accordingly, the second reactor section 122 is fitted with at least one outlet 134 for removing char from the reactor system 40. The outlet 134 can be equipped with an airlock 133 so that the temperature and vacuum are maintained in the second reactor section 122 while char is removed.

It has been discovered that the vertical arrangement of the first and second sections 120 and 122 offer significant benefits and advantages over the prior art. As an example, the overall footprint of the reactor section 40 is significantly reduced, in some cases by 50% or more, over the prior art. This achieves valuable cost advantages. Similar savings are achieved by lowering costs of shipping the reactor section 40 to an installation location. Other advantages are achieved in operational and maintenance aspects as compared to the prior art. It has also been discovered that due to the high operating temperatures and reduced operating pressures of sections 120 and 122, warping and other undesirable deformation can occur. The effects of the warping and other undesirable deformations are magnified by the overall length of the sections. Providing two separate sections 120 and 122 advantageously reduces the occurrence and undesirable results of these effects, as compared to providing a single section having the same overall length of the two sections 120 and 122.

In some embodiments, the section 120 is horizontal. In some other embodiments, the section 120 can be arranged such that it is slightly declined, with the end at which the port entry 117 is located lower than the other end of the section 120 or vice versa. In some embodiments, the section 120 is sloped at about ⅛ of an inch per one foot of the section length. Although many different degrees of slope can be used in different embodiments, a balance must be achieved between deterring the flow of feedstock through the section 120 and the contrary goal of aiding flow of gas as the feedstock is converted to gas. The slope of ⅛ inch per linear foot has been discovered to offer a good balance of these competing interests in many embodiments. The section 120 is equipped with an exit port 121 located proximate to the end that is opposite to the end at which the port entry 117 is located.

The first section 120 is connected with the second section 122 by a vertical connecting conduit 137 which connects the exit port 121 with an entrance port 123 of the section 122. Connecting conduit 137 may have substantially the same diameter as that of section 120 and 122. In some embodiments, the section 122 is horizontal and in some other embodiments, the section 122 is slightly inclined such that the entry port end is lower than the other end of the section 122. This incline has been discovered to offer important advantages and benefits related to both deterring the flow of feedstock along the length of the second section 122, and in aiding the flow of gas (in the opposite direction) that results from conversion of the feedstock 116. In some embodiments, the section 122 is sloped at about ⅛ of an inch per one foot of the section length. Again, the degree of slope may vary between embodiments, but this amount has been discovered to be particularly advantageous in many embodiments.

Various materials of construction can be used for fabrication of the reactor sections 120 and 122. Such materials should offer good performance under high temperature, good performance under elevated and vacuum pressures, and good corrosion resistance, among other characteristics. In some embodiments, the sections 120 and 122 are built of stainless steel, grade 316. Many other materials can be used, with examples including but not limited to other steels and alloys.

In some embodiments, the sections 120 and 122 are between 8 and 30 feet long. At least in some embodiments, the sections 120 and 122 are pipes with a diameter from about 10 to about 30 inches. The two sections 120 and 122 can be the same diameter and length. In alternative embodiments, the sections 120 and 122 have different diameters and lengths. In many (but not all) embodiments, it has been discovered to be advantageous to provide sections 120 and 122 that have the same length and diameter. This offers advantages related to fabrication, maintenance and operational costs, for example.

In general, the length and diameter of the sections 120 and 122 will depend on the amount of waste plastic materials or other feedstock to be processed at a particular location and can be scaled up or down accordingly. The feedstock reacts as it travels through first and second sections 120 and 122, with the result that a minimum length and diameter are desired to provide a minimum required reaction time. Reaction time can also be affected, of course, by temperature and speed of conveyance through the sections 120 and 122. Length and diameter also have important effects on heat transfer characteristics.

It has also been discovered that due to the high operating temperatures and reduced operating pressures of sections 120 and 122, warping and other undesirable deformations can occur. The effects of the warping and other undesirable deformations are magnified by the overall length of sections 120 and 122. The sections 120 and 122 are connected by the vertical conduit 137 through which the reacting feedstock is conveyed from the exit port 121 of the section 120 into the section 122. The diameter and length of the conduit 137 may vary, depending on the diameter and length of the sections 120 and 122 and other parameters. Another advantageous benefit of using vertically arranged first and second sections 120 and 122 is that gravity can be exploited to transfer the feedstock from the first section 120 to lower second section 122 to achieve cost and other savings.

During pyrolysis in the reactor 40, waste hydrocarbon materials of the feedstock are decomposed into gas phase hydrocarbons and the vapors 114 are collected and removed from the reactor sections 120 and 122. It is noted that as used herein the term "hydrocarbon vapor" is intended to be broadly interpreted. It includes hydrocarbons that are in the gas phase at a particular temperature and pressure. The hydrocarbon vapors are then condensed into useful fuel in the downstream condenser system 118.

At least in some embodiments, the hydrocarbon vapors are carried by a first vertical fuel conduit 126A and second vertical conduit 126B from the section 120 to a fuel gas manifold 132. At least in some embodiments, the hydrocarbon vapors are carried by a third vertical fuel conduit 130A and fourth vertical fuel conduit 130B from the section 122 also to the fuel gas manifold 132. Thus, all vapors from the two reactor sections 120 and 122 are collected into one manifold 132. In alternative embodiments, several manifolds can be connected such that hydrocarbon vapors from the sections 120 and 122 are collected into two or more separate manifolds. The manifold 132 may be heated (by an electric heater, for instance) to a desired temperature that is sufficient to keep the hydrocarbon vapor in the vapor phase. Premature condensation of the hydrocarbon vapor is undesirable for multiple reasons. Valuable liquid fuel is not collected in a downstream collection container for use, and/or excess energy is consumed through repeated vaporization and condensation cycles if the premature condensate makes its way back to the sections 120 and 122.

The number and location of vertical conduits 126A, 126B, 130A and 130B can also vary depending on the amount and type of plastic materials to be converted into hydrocarbons. The lengths and diameters of the conduits 126A, 126B, 130A and 130B may vary, and can be scaled up or down depending on the amount and type of waste hydrocarbon materials to be recycled.

At least one of the conduits 126A, 126B, 130A and 130B can be equipped with a monitor assessing the quality of gas hydrocarbons produced in the reactor sections 120 and 122. The conduits can be further monitored for temperature and pressure and may further include a feedback safety mechanism. The sections 120 and 122 can also be equipped with additional monitors controlling temperature and pressure in the sections.

The waste hydrocarbon feedstock material reacts as it is carried by the conveyor 148 through the section 120 and by the conveyer 149 through the section 122 and heated therein. Hydrocarbon vapor is produced from the feedstock as it is heated and travels through the sections 120 and 122. The vapor travels within the sections 120 and 122 and rises within the same due to the vacuum pump 136. The hydrocarbon vapors are collected and removed from the sections 120 and 122 by the conduits 126A, 126B, 130A and 130B. Placement, sizing and length of these conduits in invention embodiments is provided to maximize efficiency of hydrocarbon vapor collection. Various features and configurations have been discovered to offer valuable advantages and benefits.

As an example, at least in some embodiments, the conduit 126B is located at about the ⅔ of length of section 120, as measured from the end at which the feeder 116 is located; and the conduit 130B is located at about ⅓ the length of section 122 as measured starting from the vertical conduit 137. It has been discovered that these locations correspond to zones of high levels of hydrocarbon vapor production, and accordingly that placing removal conduits in these regions offers important benefits and advantages.

Similarly, in at least some embodiments, conduit 126B has a larger diameter than conduit 126A, 130A and 130B to accommodate a larger gas flow. It has been discovered that the portion of the section 120 that this conduit is adjacent to is a zone of maximum hydrocarbon vapor production, and also that some hydrocarbon vapor generated in the lower section 122 rises through the connection conduit 137 into the section 120 and is available for removal in this general region. Accordingly, it has been discovered that enlarging the conduit 126B as compared to other conduits 126A, 130A and 130B offers important benefits and advantages. The size difference can vary depending on application, but in some embodiments the diameter of conduit 126B is at least twice the size of the diameters of any of conduits 126A and 130A and B.

Selection of a particular length and diameter for the conduits 126A, 126B, 130A and 130B will also vary with application and corresponding design parameters, but some features have been discovered to offer particular advantages and benefits. As an example, it has been discovered that high gas velocity is undesirable since it increases the likelihood that unreacted feedstock or other solid particulate can be carried with the gas downstream of the sections 120 and 122 where such matter causes undesirable results (such as clogging, fouling of surfaces, and others). Increasing the diameter of the conduits 126A, 126B, 130A, and 130B results in lowering internal gas velocities. This must be balanced, however, against undesirable heat transfer characteristics that can result from too large of a diameter. In many applications a ratio of conduits 126A, 126B, 130A and 130B diameters to sections 120 and 122 diameters can be established. It has been discovered that for many applications, providing a conduit 126B that is between about 40% and 60% of the diameter of section 120, and providing conduits 126A and 130A and B that are between about 20% to 30% of the diameter of sections 120 and 122 (respectively) offers unexpected benefits and advantages.

The section 122 also contains an outlet 134, through which char is expelled from the reactor system 40. The char represents the converted feedstock, and may include some impurities in addition to elemental carbon. At least in some embodiments, the char removal outlet 134 is equipped with an airlock 133 or similar device so that char is removed from the section 122 without effecting the interior temperature and pressure of the section 122.

At least one heater 144 increases the temperature inside the sections 120 and 122 to a predetermined temperature. In some embodiments, the heater 144 may be an electric heater that converts electric energy to heat. Such heaters 144 generally include wire or other conductors that have some electrical resistance and are caused to reach elevated temperatures when voltage is passed through them. Other heaters may be used in other embodiments, with examples including convection heaters, use of heated fluids, and the like.

Figure 3:
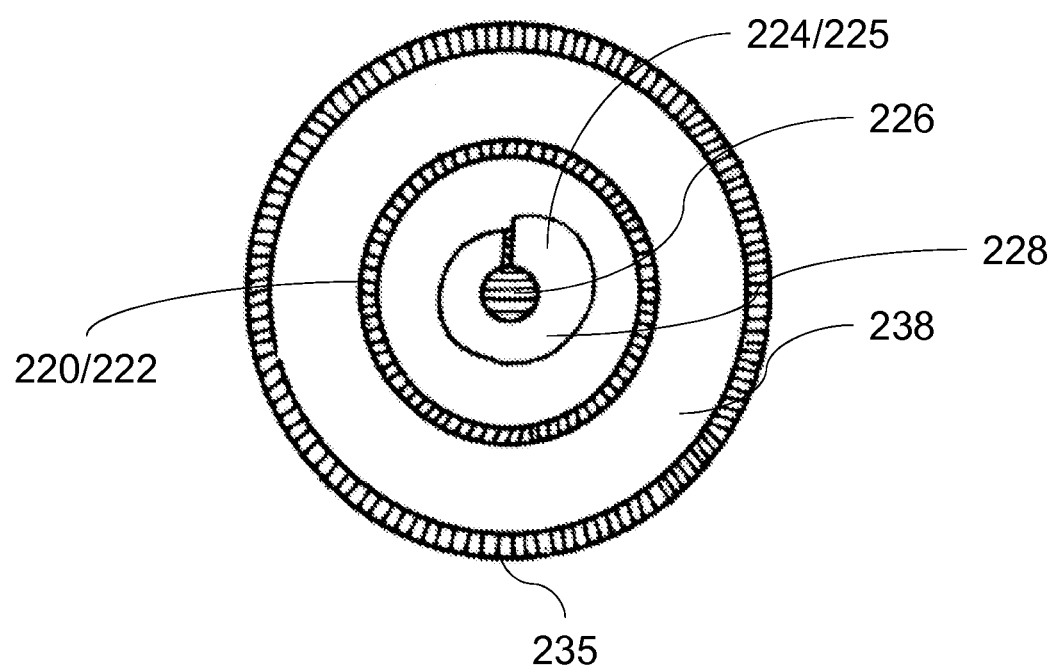
FIG. 3 is a cross-sectional view through the reactor sections 120/122 of FIG. 2.

FIG. 3 is a cross-sectional view of the reactor sections 120/122 from FIG. 2 and illustrates an embodiment in which the moving means 148 and/or the moving means 149 from FIG. 2 are a screw auger. As shown in FIG. 3, a screw auger 224 includes a central shaft 226 with a rotating helical screw blade 228 extending radially outward from the shaft 226, with rotation of the screw auger 224 causing the feedstock to be moved along the rotating screw blade 228 within the sections 220 and 222. At least in some embodiments, the section 220 is equipped with a first auger 224 and the section 222 is equipped with a second auger 225.

One or more motors and controllers (not illustrated) are provided for driving and controlling the augers 224/225, with pressure tight rotational seals also provided about an auger shaft that extends out of either of the sections 220 and 222. The augers 224 and 225 in the different sections 220 and 222 can be controlled and monitored independently for a predetermined rotation velocity, which may be equal in both sections 220 and 222 or which may be different. Velocity of the augers 224 and 225 effects the residence time of the feedstock in the sections 220 and 222. It may also be important to ensure a level of feedstock agitation within the sections 220 and 222 to achieve a useful level of uniform heating of the feedstock. The augers 224 and 225 can be further connected to a heater so that the augers are pre-heated and maintained at a pre-determined temperature.

The augers 224 and 225 may be provided in dimensions and materials as may be useful for particular applications. Various screw pitches and sizes will be useful in various different embodiments, with the screw pitch and size interrelating with rotation velocity to determine feedstock velocity. The outer diameter of the auger 224 and 225 should closely approximate the inner diameter of the respective section 220 or 222 in which it is located. Materials of construction should offer good corrosion resistance and good performance at high temperatures and low operating pressures of the sections 220 and 222. Example materials include stainless steel, including 316 grade, as well as other alloys. Other conveyors in addition to the screw augers 224 and 225 may be practiced in other embodiments, with one example being a conveyor belt.

As shown in FIG. 3, the electric heater 235 surrounds the reactor sections 220 and 222 in the general form of a blanket so that the sections 220 and 222 are heated uniformly. At least in some embodiments, the heater 235 and the outer wall of sections 220 and 222 are separated by an air-space 238, which can be between 0.5 and 1.0 inch wide. This can be useful in some applications to increase the uniformity of heating of the sections 220 and 222. One or more layers of insulation may be deployed about the heater 235 to minimize heat loss.

In some embodiments, the heater 235 includes several independently controllable zones along the reactor sections 220 and 222, and/or several independent heaters 235 are provided. In either case, different portions of the sections 220 and 222 are allowed to be heated to different desired temperatures and otherwise controlled independently. It may be useful, for example, to maintain different temperatures within different portions of the sections 220 and 222 to maximize (and/or to minimize) gas production in particular zones.

Temperature of the sections 220 and 222 can be measured at various locations and using various temperature measurement devices, with an example being a thermocouple or the like. In some embodiments temperatures are measured on an external surface of the sections 220 and 222, in some embodiments an internal temperature of the sections 220 and 222 is measured, and in some applications both and internal and an external temperature can be measured. Control of the heater(s) 235 can be based on a pre-determined desired temperature, with heater 235 power increased or decreased to maintain the desired temperature. A processor based controller can be provided to maintain such control.

The desired temperature to maintain the feedstock at for most efficient reaction will vary with application parameters including (1) particular feedstock composition, (2) operating pressure, (3) residence time in sections 220 and 222, and others. In applications in which polyethylene based feedstock is reacted under sub-atmospheric pressures of about 2-6 PSI, temperatures in the range of 650°-750° and 690°-710° have been discovered to be useful.

Referring now again to FIG. 2, in some embodiments a particularly beneficial temperature control configuration has been discovered to include measurement of the hydrocarbon gas travelling in the conduits 126A-B and 130A-B. It has been discovered that the temperature of this gas is very useful to estimate the overall reacting feedstock temperature, and in many applications it is more accurate and convenient to obtain than are temperatures of the feedstock itself. The feedstock may be subject to some degree of varying temperature in sections 120 and 122 as it is agitated by the screw auger and otherwise travels through the sections 120 and 122. Accurate determination of an overall temperature may therefore be difficult to obtain. Additionally, physically measuring such a temperature may prove difficult given the combination of a high temperature, moving conveyor (e.g., rotating screw auger), and moving hot mass of reacting feedstock.

It has been discovered that measurement of the temperature of the hydrocarbon gas in the conduits 126A-B and 130A-B is much easier to obtain, and is much more likely to be uniform in temperature due to mixing as it flows as well as other reasons. Accordingly, in some embodiments one or more temperature measurement devices, with an example being a thermocouple, are provided in each of conduits 126A-B and 130A-B and heater(s) 144 controlled based on the measured temperature of the hydrocarbon gas in the various conduits.

In some embodiments, heater 144 is wrapped about a section of first reactor section 120 upstream of and adjacent to conduit 126A to define heater zone 145. A thermocouple measures the internal hydrocarbon gas temperature in conduit 126A, and is connected to controller and/or power supply (not illustrated) that in turn powers the heater 144 that defines heater zone 145. The controller/power supply is configured to respond to a measured temperature change in the conduit 126A by increasing heat energy when the temperature drops below a low limit and by decreasing heat energy when the measured temperature exceeds a high limit. The high and low limits are pre-defined. The results of these changes in heat energy cause the internal reactor section 120 temperature within the heater zone 145 to change—to decrease when the gas temperature in the conduit 126A exceeds the high limit and to increase when the temperature in the conduit 126A is lower than the low limit. Similarly, independently controlled heaters 144 (or heater portions) may heat zones of the sections 120 and 122 that are proximate to conduits 126B, 130A and 130B based on response to hydrocarbon temperatures measured in those respective adjacent conduits. For example, a heat zone 146 is situated near the conduit 126B and is regulated based on the gas temperature in the conduit 126B.

In some embodiments, the power to the heater 144 is varied to achieve a desired hydrocarbon gas temperature which may be, for example, about 700° F., about 690°-710° F., about 650°-750° F., or other temperature depending on factors including the feedstock composition. In some embodiments, temperatures within the sections 120 and 122 are alternatively or also controlled by control of the rate of introduction of feedstock to the section 120, and/or the residence time therein (through rate of conveyance of the feedstock through the sections 120 and 122). If a constant amount of heat energy is supplied, increasing the rate of feedstock introduction will cause the temperature to decrease, and vice versa. The controller is therefore also useful in at least some embodiments to control the rate of introduction of feedstock into the section 120 and/or the speed of conveyance through the sections 120 and 122.

Having now discussed various features of an example heating section 40, a further description of example waste hydrocarbon, feedstocks and upstream feeder section 142 will be useful. Many different types of waste hydrocarbon materials are suitable for use in the reactor system 40. Such materials include, but are not limited to, wood, paper, polymers such as polyethylene and polypropylene as found, for example, in municipal and commercial waste, including used carpets, plastic wrap, packaging materials including but not limited to bags, post consumer packaging, tires and other scrap rubber, and many other waste materials.

The waste hydrocarbon materials may include a primary plastic waste and secondary waste materials. The primary plastic waste is the plastic that is targeted to be converted into fuel and other useful materials in a waste conversion system. Secondary waste materials include other materials that may be attached to the primary plastic waste. Examples of secondary waste materials include, but are not limited to, paper labels, adhesives, ink, paint or other plastics from coatings or parts of or attached to the original product. For example, waste plastic packaging often has a printed paper label attached to it with an adhesive. Another example of a possible material is a waste plastic food container with a lid. The lid can be made of printed paper with multiple plastic coatings to provide moisture and oxygen barrier properties. The lid could then be attached to the waste plastic container using a seal-peel adhesive. While the waste plastic container is made of the primary plastic waste, the lid can include several different secondary waste materials. In some embodiments, the waste plastic materials can be separated from secondary materials before they are utilized in a reactor system according to the present invention. This can be achieved by shredding and then extruding plastic materials to remove paper, other contaminating materials and moisture and to compress plastic materials into a form easily suitable for moving plastic materials through the waste plastic feeder connection 116.

The waste hydrocarbon materials enter the reactor system 40 through the feeder connection 116. In the feeder 142 (FIG. 2), the waste hydrocarbon materials may be pre-heated. One embodiment of the feeder includes a chamber 142 closed to the reactor system 40 and into which the waste plastic flows. In other embodiments, the chamber 142 is arranged within the heater section (not shown in FIG. 2) proximate to the feeder connection 116 and/or the entry port 117. After filling the chamber 142, it is closed to the atmosphere and its pressure is reduced to the sub-atmospheric pressure of the heater section 110 through application of vacuum (which also removes or reduces oxygen content), it is then opened to the heater section (not shown in FIG. 2) and contained feedstock can then be communicated into the heater section. In this manner, feedstock is communicated into the heater section (not shown in FIG. 2) without effecting pressure or introducing oxygen. Some embodiments of the feeder utilize a vacuum pump to apply the vacuum to and remove air from the chamber 142.

The waste feedstock flow from the feeder chamber 142 into the first reactor section 120 through the feeder connection 116 and into the port entry 117. The waste hydrocarbon materials such as waste plastics may include long-chain hydrocarbons having a range of molecular weights. In the reactor system 40, the waste plastics are thermally treated to break them down into shorter chain hydrocarbons. As discussed above, the first reactor section 120 may include at least a first heating zone 145 and at least a second heating zone 146. At least in some embodiments, the temperature in the first heating zone 145 varies from about 600° F. (316° C.) to about 650° F. (343° C.). In the second heating zone 146; the temperature ranges from about 690° F. (366° C.) to about 710° F. (377° C.). Under these conditions, which include a substantial or complete lack of oxygen, a portion of the waste plastics thermally decomposes to form shorter chain hydrocarbons. Some of the plastics also melt to form liquids. Under these conditions, the well-defined waste plastic material decomposes into a gaseous phase hydrocarbon product and a soft, plastic, semi-liquid residue that further decomposes to gas phase hydrocarbon. The gas hydrocarbon vapors are collected through the conduits 126A and 126B into the manifold 132.

As the long-chain plastic molecules break down and enter the gaseous phase, the remaining long-chain hydrocarbons can be more difficult to crack. Also, the solid or liquid fill volume of the first and second sections 120 and 122 may decrease as they are converted to gas products, leaving a gas filled void space that complicates heat transfer within the sections 120 and 122. In some embodiments, the temperature of the sections 120 and 122 are increased over the length of the sections 120 and 122 to break apart the remaining feedstock polymer molecules.

The plastic residue moves along the length of the section 120 by a screw auger 148. After reaching the conduit 137, the plastic residue is moved into the section 122 through the conduit, and pyrolysis is continued as the plastic residue is moving along the section 122 by another auger 149. In some embodiments, hydrocarbon vapors are collected from the section 22 through the conduits 130A and B and into the manifold 132. Char as well as any non-hydrocarbon impurities (such as metal) is expelled out from the section 122 through the outlet 116.

The instant invention provides a reactor system that can be scaled up or down for recycling. The reactor system can be operated continuously, semi-continuously or in batches. The plurality of operation cycles is beneficial because it increases the efficiency. For example, in some applications it is more preferable to operate the system continuously if plastic materials are available constantly because it saves the energy needed to pre-warm the reactor system. However, if plastic materials are available only from time to time, then a batch mode may be preferred.

According to the instant invention, several parameters can be monitored and controlled for optimal production of gas hydrocarbons during pyrolysis in an example reactor system disclosed in this patent application. These parameters may include pressure, temperature, pH, mass or volumetric feedstock flow rate, feedstock residence time in the heater sections, and others. Under example conditions, one example reactor system according to the present invention can recycle about 40 tons of waste polyethylene materials into 8,000 gallons of liquid fuel as well as flammable gasses in about 24 hours of operation.

At least in some embodiments in which feedstock includes polyethylene, it has been discovered that a useful reaction temperature can be calculated such that the conversion process is substantially isothermal and takes place at the substantially constant temperature selected from the range from about 650° F. to about 750° F. In some other embodiments, the Optimal temperature is from about 690° F. to about 710° F. The optimal temperature may vary depending on feedstock composition, operating pressure, and other factors.

The quality and quantity of gasified hydrocarbons can be further increased by controlling the residence time of feedstock in the reactor sections 120 and 122, which can be controlled for example by the speed at which plastic materials are moving through the sections 120 and 122. This can be adjusted by controlling the rotation velocity of the augers 148 and 149. Additionally, a speed at which plastic materials are communicated into the reactor system can also be controlled so that a measured amount of plastic materials is delivered. In some embodiments, a pH in the reactor system can be lowered down to about 3. In some other embodiments, a pH in the reactor system can be lowered down to about 2. In yet some other embodiments, a pH in the reactor system can be lowered down to about 1.

Attention is now turned to the downstream treatment of gaseous hydrocarbon products that result from the heater sections 120 and 122. There are many different products that can be obtained by pyrolysis of plastic materials in the reactor system of the present invention. For example, hydrocarbon vapors can be condensed into diesel, gasoline, mineral oil or paraffin wax. In some embodiments, a gas condensation system can be built such that at least one heat exchanger is used and hydrocarbons are condensed into a liquid product slowly. This single liquid product may be sold or otherwise transferred offsite for further refining by a third party at another facility. Other embodiments may include a gas condensation system that includes more sophisticated condensation performed step-wise to produce different grades of petroleum product. As an example, another embodiment includes more than one condensing heat exchanger arranged in sequence and operating at different temperatures and/or pressures to cause different quality petroleum products to be condensed at each step. In some embodiments, the condensing section includes at least five heat exchangers.

Figure 4:
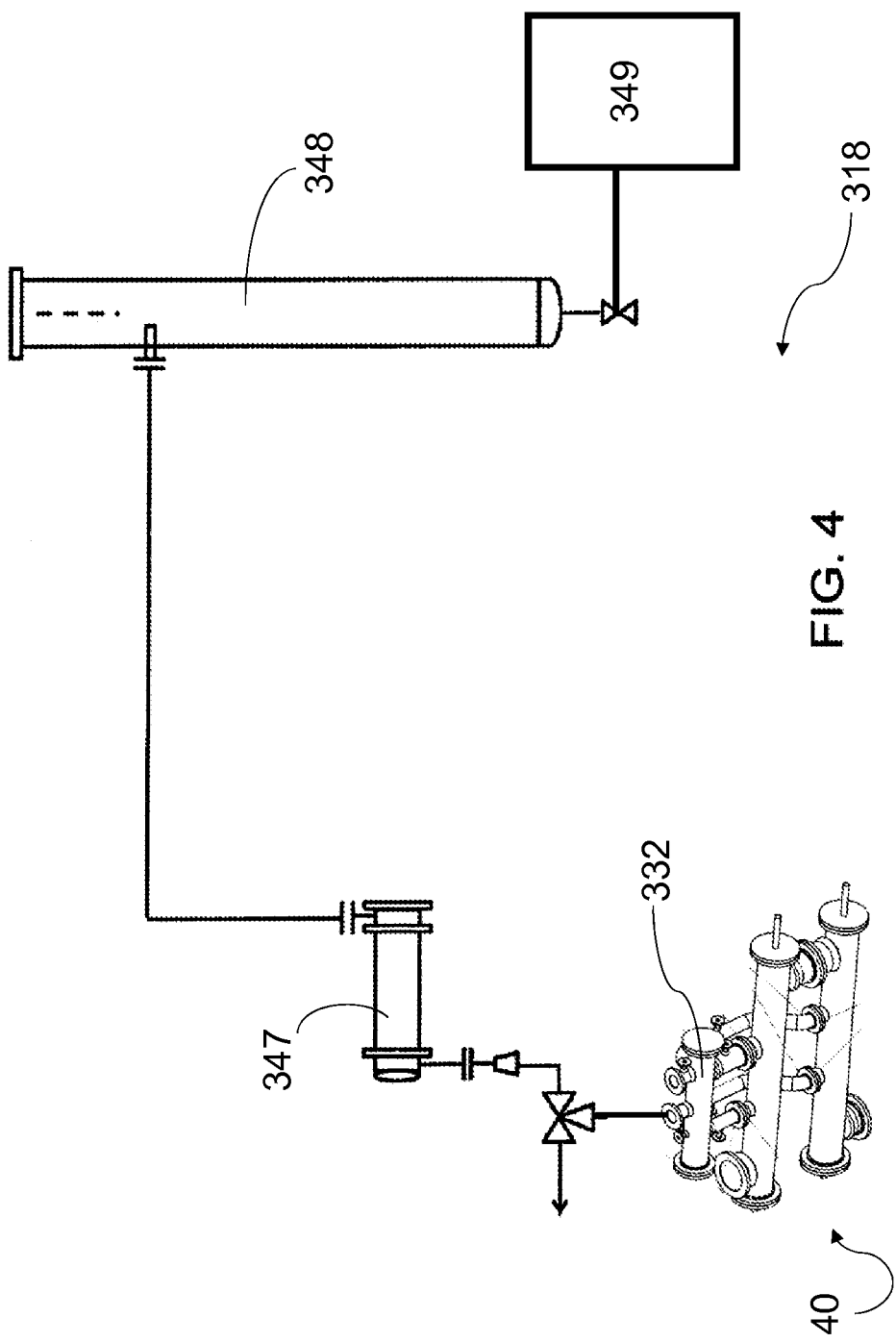
FIG. 4 is a representation of a condenser section.

FIG. 4 shows an example condenser section, generally designated 318, in which a heat-exchanger 347 is connected with the manifold 332 of the reactor 40 shown in FIG. 2 by a short pipe. The heat-exchanger 347 is designed such that gas hydrocarbons are gradually cooled down in the exchanger 347 to a predetermined temperature and then further converted into fuel in a condensation tank 348. The heat exchanger 347 may include a shell and tube or other traditional design that utilizes chilled water or refrigerant to absorb heat. The condenser section 318 can be equipped with a temperature and pressure monitor.

Another product of the condenser section 318 are one or more flammable hydrocarbon gasses, which may include for example methane, ethane, propane and others. These can be collected in tank 349 for later use or sale. In some invention embodiments these can be converted to heat energy for use in heating the sections 120 and 122 (FIG. 2). In some invention embodiments these gasses can be directly combusted to create heat that is applied to the sections 120 and 122. In some other embodiments these gasses are combusted in a generator—that converts the combustion energy to electricity to power electric heaters 144 (FIG. 2) that heat the sections 120 and 122.

Various elements of different example embodiments have been discussed and illustrated herein. This has been done for purposes of illustrating some invention embodiments, and should not be interpreted as a limitation on the scope of the invention as claimed below. Indeed, those knowledgeable in the art will appreciate that numerous variations, modifications, and equivalents may be employed in differing invention embodiments while not exceeding the scope of the invention as claimed. As an example, specific embodiments useful with practice at paper mills or waste processing plants to convert waste plastics have been discussed. Many other invention embodiments, however, will find utility at other commercial facilities with other waste hydrocarbon materials, with examples including waste rubber tires, waste animal portions at meat or poultry processing plants, waste agricultural materials, and the like.

What is claimed is:

1. A system for converting waste hydrocarbon materials into fuel, the system comprising:
   a first reactor section and a second reactor section arranged vertically relative to one another, the first reaction section communicates with the second reactor section through a connection conduit;
   at least one conveyor for communicating the waste hydrocarbon materials through the first and second sections;
   at least one heater for heating the first and second sections to cause the feedstock to convert to gas phase fuel products; and,
   a condensing section downstream from and in communication with the first and second reactor sections for condensing at least one liquid fuel product from the gas phase fuel products, further comprising a plurality of collection conduits for communicating the gas phase fuel to a manifold that is upstream of the condensing section, and further comprising a heater for maintaining the manifold at a temperature sufficient to keep the gas phase fuel in a gaseous state.

2. A system as in claim 1, wherein the first and second reactor sections each have a substantially tubular shape and are of the same length and diameter.

3. A system as in claim 1, wherein the first reactor section is horizontal and arranged directly above the second reactor section, the second reactor section arranged at a slight incline so that a first end of the second reactor section having an entrance port communicating with the connection conduit is higher than a distal second end having an exit port; and,
   wherein the system further includes a vacuum source for evacuating substantially all of the oxygen from the first and second reactor sections.

4. A system as in claim 1, wherein:
   the first reactor section is arranged at a slight incline from a first end having an entrance port to a distal second end having an exit port that communicates with the connection conduit; and,
   the second reactor section is arranged at a slight incline from wherein a second reactor section end having an entrance port communicating with the connection conduit is higher than a second section distal second end having an exit port.

5. A system as in claim 1, wherein:
   the at least one conveyor comprises a first auger that communicates the waste hydrocarbon feedstock from a first reactor section entrance port to a first reactor section exit port; and
   a second auger that communicates the waste hydrocarbon feedstock from a second reactor section entrance port to a second reactor section exit port, the first and second augers independently controllable wherein speed of feedstock conveyance may be different in the first reactor section as compared to the second reactor section.

6. A system as in claim 5, wherein at least one auger includes a heater for heating the auger to an elevated temperature.

7. A system as in claim 1, wherein the at least one heater is electric, and further comprising a plurality of temperature measurement devices arranged within the first and second reactor sections.

8. A system as in claim 1, wherein the condensing section further causes a flammable gas fuel to be produced, and wherein at least a portion of the flammable gas is used to power the at least one heater.

9. A system as in claim 8, wherein the at least one heater is an electric heater, wherein the system further includes a generator that converts at least a portion of the flammable gas fuel to electricity that powers the at least one heater.

10. A system as in claim 1, wherein the first and second reactor sections collectively include a plurality of sub-zones arranged in sequence from a first reactor section entrance to a second reactor section exit, a final sub-zone proximate to the second reactor section exit having an internal temperature that is higher than any other sub-zone interior temperature.

11. The system of claim 1, wherein at least one of the first reactor section and the second reactor section are slightly inclined to the ground, and wherein the system further includes a vacuum source for pulling vacuum on the first and second reactor sections wherein the heating of the feedstock occurs in the substantial absence of oxygen.

12. The system of claim 1, wherein the second reactor section includes a first end in communication with the connection conduit and a distal second end having an exit for discharging char, and wherein the second reactor section first end is elevated over the distal second end.

13. The system of claim 1, wherein the first reactor section includes first and second collection conduits and the second reactor section includes third and fourth collection conduits, and wherein the second collection conduit is located about ⅔ along the length of the first section measured from a first reactor section entrance and has a diameter that is at least about twice the diameter of the first conduit that is located closer to the first section entrance.

14. A waste hydrocarbon recycling system comprising:
a reactor including a first reactor section arranged above a second reactor section, a connection conduit connecting the first and second reactor sections, the second reactor section arranged at a slight incline with a first end proximate to the connection conduit higher than a distal second end;
at least first and second transfer conduits connected to each of the first and second reactor sections for transferring hydrocarbon gas products from the reactor sections, at least one temperature measurement device in each of the transfer conduits;
a plurality of heaters provided on the first and second reactor sections configured to maintain the reactor sections at elevated temperatures to cause conversion of the feedstock to the hydrocarbon gas products, the heater in a section of one of the first or second conduits that is adjacent to one of the plurality of gas transfer conduits responsive to increase or decrease heat energy responsive to changes in the temperature in the one gas transfer conduit as measured by the at least one temperature measurement device;
a condensing section downstream from the reactor sections in communication with the transfer conduits and configured to condense liquid petroleum from the gas hydrocarbon products leaving flammable gas products; and,
a generator communicating with the condensing section for converting at least a portion of the flammable gas to energy used to power the at least one heaters.

15. A waste hydrocarbon reactor for connection to a downstream condensing section, the reactor comprising:
a reactor having an entrance port and a discharge port;
a vacuum source in communication with the first reactor section configured to maintain a lower than atmospheric pressure in the first reactor sections;
a first screw auger extending through the reactor; and,
a plurality of gas transfer conduits communicating with the reactor for removing gas phase hydrocarbon products from the reactor, at least one of the gas transfer conduits having a larger diameter than any of the other gas transfer conduits;
at least one temperature measurement device in each of the plurality of gas transfer conduits; and,
a plurality of independently controlled heaters arranged on the reactor and configured to maintain a desired temperature in the reactor, each of the plurality of heaters that are proximate to one of the plurality of gas transfer conduits configured to respond to a measured temperature change in the adjacent conduit by increasing heat energy when the temperature drops below a low limit and by decreasing heat energy when the measured temperature exceeds a high limit.

16. A waste hydrocarbon reactor as defined by claim 15, wherein the reactor comprises:
a substantially tubular first reactor section having an entrance port and a discharge port;
a second reactor section that is substantially identical to the first reactor section, the second reactor section arranged vertically below the first reactor section and having an entrance port and a discharge port, the second reactor section arranged at a slight incline with a first end including the entrance port higher than a distal second end having the discharge port; and
a connection conduit communicating between the first reactor section discharge port and the second reactor section entrance port.

* * * * *